O. F. ZAHN.
ROLLER BEARING.
APPLICATION FILED JUNE 26, 1911.
1,055,849.
Patented Mar. 11, 1913.
2 SHEETS—SHEET 1.
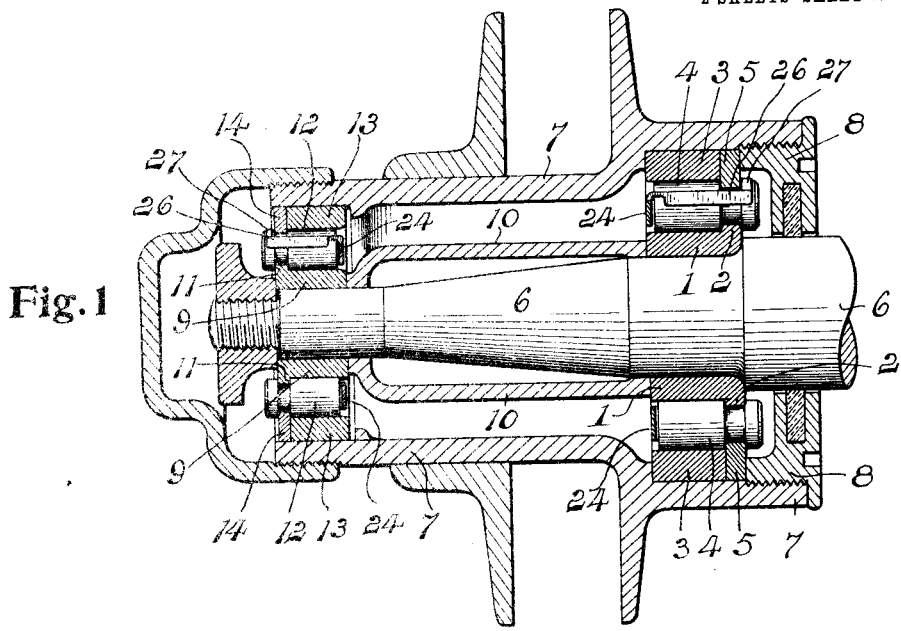
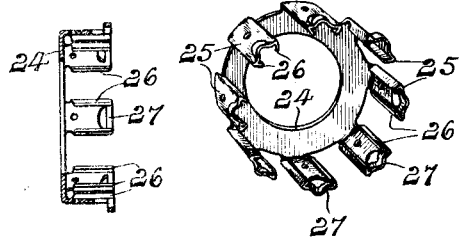
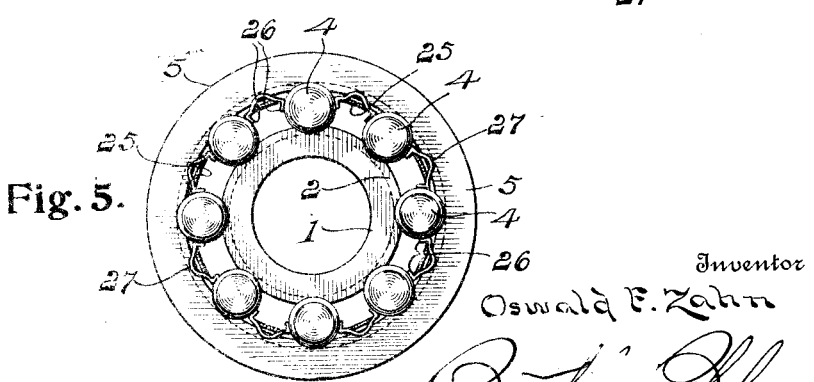
Witnesses
Inventor
Oswald F. Zahn
By
Attorneys

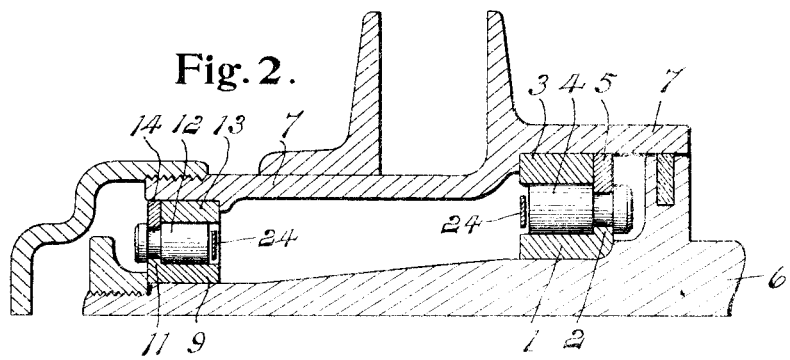
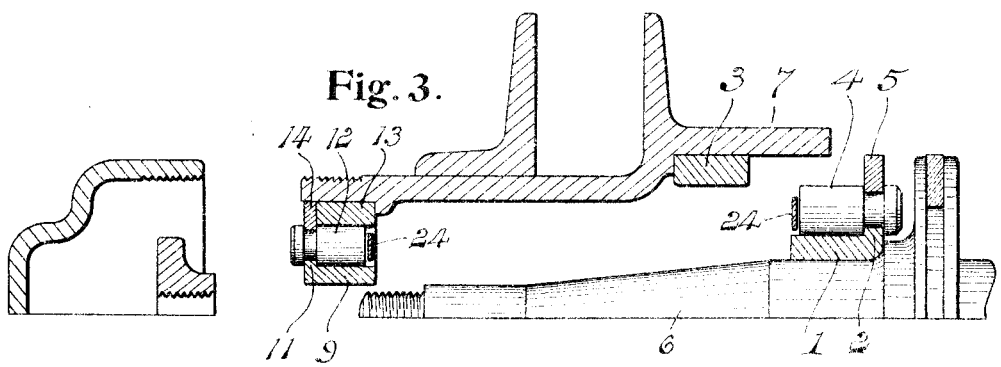
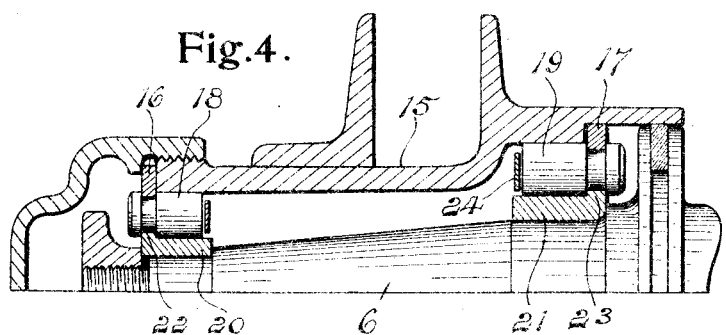

UNITED STATES PATENT OFFICE.

OSWALD F. ZAHN, OF DETROIT, MICHIGAN.

ROLLER-BEARING.

1,055,849.     Specification of Letters Patent.     Patented Mar. 11, 1913.

Application filed June 26, 1911. Serial No. 635,431.

*To all whom it may concern:*

Be it known that I, OSWALD F. ZAHN, a citizen of the United States of America, residing at Detroit, in the county of Wayne and State of Michigan, have invented certain new and useful Improvements in Roller-Bearings, of which the following is a specification, reference being had therein to the accompanying drawings.
This invention relates to anti-friction bearings and more especially those of the roller type and to a certain arrangement and construction thereof whereby the parts are not only readily machined and assembled, but are easily taken apart for inspection and repair without displacing the rolle members.

One feature of the invention is the disposition of the rollers to transmit end thrust from a shaft to a bearing or the reverse, and the construction of the elements of the bearing are so that they may be assembled to transmit end thrust in either one or both directions.
Another feature of the invention is a spacing member which insures the proper distribution of the rolls with slight frictional resistance.

The invention consists in the matters hereinafter set forth, and more particularly pointed out in the claim.

In the drawings, Figure 1 is a view, partially in longitudinal section and partially in elevation, of an arbor with a wheel hub mounted in operative relation on a pair of bearings that embody features of the invention; Fig. 2 is a partial sectional view showing a modification of the bearing in assembled relation; Fig. 3 is a view similar to Fig. 2 showing the parts separated; Fig. 4 is a view of another modification of a bearing; Fig. 5 is a view in end elevation of an assembled bearing and spacing member; Fig. 6 is a view in perspective in detail of a spacing member; Fig. 7 is a view in longitudinal section of the spacing member.

As herein shown in preferred form an inner bearing member 1 has an external flange 2, preferably integral therewith, which constitutes a thrust track. An outer bearing member 3 runs on the bodies of interposed friction rolls 4 concentrically with the member 1. The rolls are each grooved preferably near one end, to engage the thrust track and are further retained by a separate track ring 5 adjacent the outer bearing member 3 engaging the roller grooves of less outer diameter than the outer bearing member so that it may have a slide fit in the outer hub or like part and be more readily removed than the said outer member.

In an assembled structure such as shown in Fig. 1, wherein a pair of bearings are used as is one usual custom, a shouldered arbor 6 receives the inner member 1 while the outer member 3 is secured in an outer hub 7 each preferably by a drive fit or the like. The outer track ring 5 may be secured by a dust collar 8 or the like screw-threaded or otherwise detachably mounted in the hub. A corresponding bearing is placed at the outer end of the arbor 6 in reverse position to the one just described, with an inner bearing member 9 held in spaced relation to the member 1 by a suitable sleeve 10 or the like. A flange 11 formed on or secured to the member 9 engages grooves in the outer ends of rollers 12 which center an outer bearing member 13 concentrically to the inner member. The outer member, corresponding to the member 3 of the inner bearing, is likewise secured as by a drive fit, in the hub 7. An outer separate track ring 14, similar to the ring 5 engages the grooves of the rollers 11. Like the ring 5 it may have an easy sliding fit in the hub 7, so that when the bearings are withdrawn the track rings come away with the rolls, leaving the outer members fast in the hub. In the assembled view shown in Fig. 1, the bearing at the inner end of the journal 6 is arranged to take the end thrust both ways while the outer bearing is arranged to move laterally as desired in the hub or in other words to float freely without undergoing end pressure.

In Figs. 2 and 3, a pair of bearings are shown so disposed that each takes an end thrust, the endwise play being taken up by an outer bur or nut as desired, while the assembled construction shown in Fig. 1 is nonadjustable.

In Fig. 4, a further modification is shown wherein the outer bearing members 13 and 3 indicated in Fig. 1 are omitted and the hub 15 itself becomes a bearing member. Outer track rings 16 and 17 bear against the hub to engage channels or grooves of rollers 18 and 19 running on inner bearing members 20 and 21, each provided with external flanges or thrust tracks 22 and 23.

Other modifications are obvious and need not be shown.

The rollers are held apart by a spacing ring or cage. In preferred form this is made of an annulus 24 of sheet metal having radial arms 25 that are bent parallel to the annulus axis with their marginal portions 26 inturned to bear against the faces of the interposed rolls. Each arm is transversely slotted near its outer end and a cross strip or bridge 27 resulting therefrom is sprung up as indicated in Fig. 5 to bear with its inner margin against the adjacent face of the track ring or outer member. By this method of construction an anti-friction bearing is obtained which is readily applicable for use in a variety of cases and for different purposes, and which may be readily demounted for inspection or replacement of parts, the particular feature of the outer track ring separable from the outer bearing member facilitating both the machining and the assembling or replacing. The resilient arms of the one piece cage maintain the rolls in spaced position while yielding slightly if necessary under varying conditions while one particular advantage of the construction is the interlocking of the cage ends with the outer or separate track ring so that the latter comes away with the friction rolls and inner bearing members. This allows the bearing to be taken down with the rolls open to inspection without having to replace or remount the latter. By this construction, a bearing is obtained with a wide range of usefulness, that is capable of being mounted as a single complete bearing taking end thrust in both directions or of being associated in pairs, either arrangement including the feature of both bearing members being retained if desired, by a drive fit in or on the parts journaled together by the bearing.

Obviously, changes in the details of construction may be made without departing from the spirit of the invention and I do not care to limit myself to any particular form or arrangement of parts.

What I claim is:—

In a roller bearing, the combination with an inner annular member with an external thrust track near one end, rolls running on the bearing member with grooves engaged by the thrust track, an outer bearing member traveling on the bodies of the rolls and a track ring encircling the rolls in engagement with the grooves, of a spacing member having an annulus bearing against one end of the rolls with arms extending between the rolls having off-set portions in sliding contact with the outer face of the track ring.

In testimony whereof I affix my signature in presence of two witnesses.

OSWALD F. ZAHN.

Witnesses:
OTTO F. BARTHEL,
G. E. McSRANN.